(12) United States Patent
Thacker et al.

(10) Patent No.: US 7,708,801 B2
(45) Date of Patent: May 4, 2010

(54) SYSTEM AND METHODS FOR TREATING TRANSIENT PROCESS GAS

(75) Inventors: Pradeep Thacker, Bellaire, TX (US); Sachin Naphad, Houston, TX (US)

(73) Assignee: General Electric Company, Schenectady, NY (US)

( * ) Notice: Subject to any disclaimer, the term of this patent is extended or adjusted under 35 U.S.C. 154(b) by 221 days.

(21) Appl. No.: 11/938,076

(22) Filed: Nov. 9, 2007

(65) Prior Publication Data
US 2009/0120285 A1 May 14, 2009

(51) Int. Cl.
*B01D 53/14* (2006.01)
*B01D 53/18* (2006.01)
(52) U.S. Cl. .................... 95/1; 95/159; 96/244
(58) Field of Classification Search ........ 95/1, 95/19, 159, 169, 235, 236; 96/244, 252, 96/253; 423/220, 228, 229; 208/208 R
See application file for complete search history.

(56) References Cited

U.S. PATENT DOCUMENTS

| | | | | |
|---|---|---|---|---|
| 4,138,230 A | * | 2/1979 | Thompson | 95/169 |
| 4,568,364 A | | 2/1986 | Galstaun et al. | |
| 4,772,298 A | * | 9/1988 | Stewart | 96/252 |
| 5,240,476 A | | 8/1993 | Hegarty | |
| 5,289,676 A | * | 3/1994 | Brown et al. | 60/781 |
| 5,688,296 A | | 11/1997 | Andrus, Jr. et al. | |
| 5,851,265 A | * | 12/1998 | Burmaster et al. | 95/159 |
| 6,090,356 A | | 7/2000 | Jahnke et al. | |
| 6,139,605 A | * | 10/2000 | Carnell et al. | 95/164 |
| 6,824,575 B1 | | 11/2004 | Otomo et al. | |
| 6,998,098 B2 | | 2/2006 | Allison | |
| 7,056,487 B2 | | 6/2006 | Newby | |

* cited by examiner

*Primary Examiner*—Frank M Lawrence
(74) *Attorney, Agent, or Firm*—Armstrong Teasdale LLP

(57) ABSTRACT

A system and methods of reducing sulfur emissions are provided. In one embodiment, a method for reducing sulfur emissions is provided. The method includes routing at least a portion of an untreated gas to a low pressure absorber, removing at least a portion of sulfur from the untreated gas to create a low pressure absorber overhead gas, and further processing the low pressure absorber overhead gas.

19 Claims, 2 Drawing Sheets

SYSTEM AND METHODS FOR TREATING TRANSIENT PROCESS GAS

BACKGROUND OF THE INVENTION

This invention relates generally to gasification systems, and more particularly, to a system and methods for treating transient process gas.

At least some known gasification systems, such as those used in power plants, include a gasification system that is integrated with at least one power-producing turbine system, thereby forming an integrated gasification combined cycle (IGCC) power generation system. For example, known gasification systems convert a mixture of fuel, air or oxygen, steam, and/or CO2 into a synthetic gas, or "syngas". The syngas is channeled to the combustor of a gas turbine engine, which powers a generator that supplies electrical power to a power grid. Exhaust from at least some known gas turbine engines is supplied to a heat recovery steam generator (HRSG) that generates steam for driving a steam turbine. Power generated by the steam turbine also drives an electrical generator that provides electrical power to the power grid.

At least some known gasification systems associated with IGCC systems initially produce a "raw" syngas fuel that includes carbon monoxide (CO), hydrogen ($H_2$), hydrogen sulfide ($H_2S$) and carbon dioxide ($CO_2$). Hydrogen sulfide is commonly referred to as an acid gas. Acid gas is generally removed from the raw syngas fuel to produce a "clean" syngas fuel for combustion within the gas turbine engines. At least some known acid gas removal is performed with an acid gas removal subsystem that typically includes at least one main absorber to remove a majority of the $H_2S$.

At least some known systems may be incapable of meeting current emissions requirements during all operating conditions. For example, high sulfur start-up fuels may produce a large quantity of emissions. Although most of such emissions generated may be captured during the acid gas removal process, at least some of such emissions may be released into the atmosphere during transient operating periods, such as system startups, shutdowns, and equipment trips.

BRIEF DESCRIPTION OF THE INVENTION

In one aspect, a method for reducing sulfur emissions is provided. The method includes routing at least a portion of an untreated gas to a low pressure absorber, removing at least a portion of sulfur from the untreated gas to create a low pressure absorber overhead gas, and further processing the low pressure absorber overhead gas.

In another aspect, a method for removing sulfur from transient process gases is provided. The method includes isolating a first portion of an untreated gas from a second portion of the untreated gas, routing the first portion of the untreated gas to a low pressure absorber, removing at least a portion of sulfur from the first portion of the untreated gas to create a low pressure absorber overhead gas, further processing the low pressure absorber overhead gas, and recycling the second portion of the untreated gas.

In another aspect, a treatment system for transient process gases includes at least one sulfur removal unit, a tail gas unit coupled in flow communication downstream from the at least one sulfur removal unit, at least one blower coupled in flow communication downstream from the tail gas unit, at least one low pressure compressor coupled in flow communication downstream from the at least one blower, a low pressure absorber coupled in flow communication downstream from the at least one low pressure compressor, an acid gas stripper coupled in flow communication downstream from the low pressure absorber, and at least one high pressure compressor coupled in flow communication downstream from the at least one low pressure compressor. The treatment system is configured to, during a system shutdown sequence, bypass a main absorber by routing a raw syngas to the low pressure absorber. The treatment system further configured to treat transient process gases by combining at least a portion of an untreated tail gas and a portion of an acid gas, routing the combined gases to the low pressure absorber, removing at least a portion of sulfur from the combined gases to create a low pressure absorber overhead gas, and further processing the low pressure absorber overhead gas.

DETAILED DESCRIPTION OF THE INVENTION

As used herein, the term "lean" is used to describe a solvent that is substantially emissions free, and the term "rich" is used to describe a solvent containing emissions.

Figure 1:
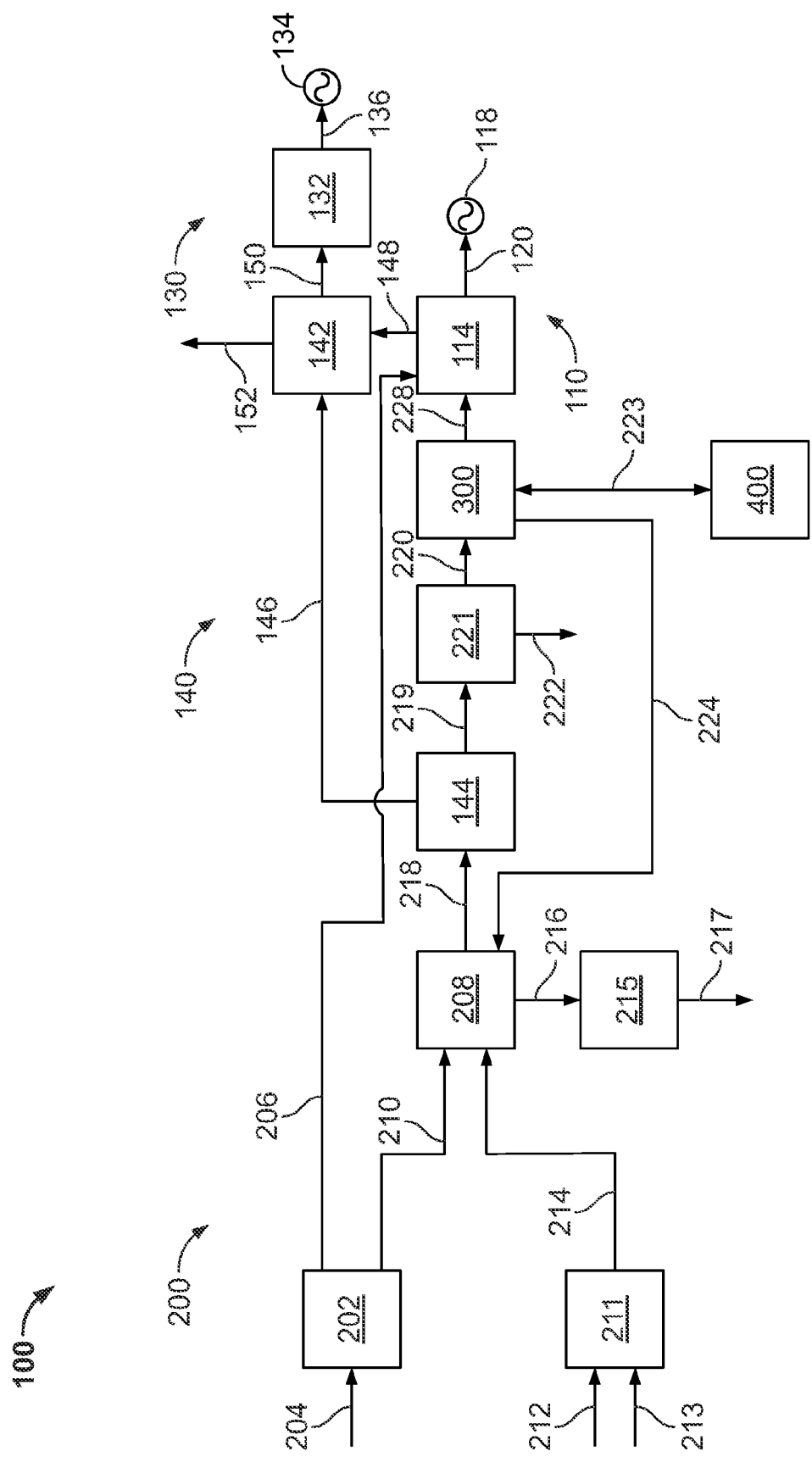
FIG. 1 is a schematic diagram of an exemplary integrated gasification combined-cycle (IGCC) power system.

FIG. 1 is a schematic diagram of an exemplary integrated gasification combined-cycle (IGCC) power generation system 100, such as those used in power plants. In the exemplary embodiment, IGCC system includes a gas turbine engine 110. Turbine 114 is rotatably coupled to a first electrical generator 118 via a first rotor 120. Turbine 114 is coupled in flow communication with at least one fuel source and at least one air source (both described in more detail below) and is configured to receive the fuel and air from the fuel source and the air source, respectively. Turbine 114 produces rotational energy that is transmitted to generator 118 via rotor 120, wherein generator 118 converts the rotational energy to electrical energy for transmission to at least one load, including, but not limited to, an electrical power grid (not shown).

IGCC system 100 also includes a steam turbine engine 130. In the exemplary embodiment, engine 130 includes a steam turbine 132 rotatably coupled to a second electrical generator 134 via a second rotor 136.

IGCC system 100 also includes a steam generation system 140. In the exemplary embodiment, system 140 includes at least one heat recovery steam generator (HRSG) 142 that is coupled in flow communication with at least one heat transfer apparatus 144 via at least one heated boiler feedwater conduit 146. HRSG 142 is configured to receive boiler feedwater (not shown) from apparatus 144 via conduit 146 for heating the boiler feedwater into steam. HRSG 142 also receives exhaust gases (not shown) from turbine 114 via an exhaust gas conduit (not shown) to further heat the boiler feedwater into steam. HRSG 142 is coupled in flow communication with turbine 132 via a steam conduit 150. Excess gasses and steam are exhausted from HRSG 142 to the atmosphere via stack gas conduit 152.

Steam conduit 150 channels steam from HRSG 142 to turbine 132. Turbine 132 receives the steam from HRSG 142 and converts the thermal energy in the steam to rotational energy. The rotational energy is transmitted to generator 134 via rotor 136, wherein generator 134 converts the rotational energy to electrical energy for transmission to at least one load, including, but not limited to, an electrical power grid.

IGCC system 100 also includes a gasification system 200. In the exemplary embodiment, system 200 includes at least one air separation unit 202 that is coupled in flow communication with an air source via an air conduit 204. In the exemplary embodiment, such air sources include, but are not limited to, dedicated air compressors and/or compressed air storage units (neither shown). Air separation unit 202 separates air into oxygen ($O_2$), nitrogen ($N_2$) and other components that are released via a vent (not shown). The nitrogen is channeled to gas turbine 114 to facilitate combustion.

System 200 includes a gasification reactor 208 that is coupled in flow communication with air separation unit 202 and that receives the $O_2$ channeled from unit 202 via a conduit 210. System 200 also includes a coal grinding and slurrying unit 211. Unit 211 is coupled in flow communication with a coal source and a water source (neither shown) via a coal supply conduit 212 and a water supply conduit 213, respectively. Unit 211 is configured to mix coal and water together to form a coal slurry stream (not shown) that is channeled to gasification reactor 208 via a coal slurry conduit 214.

Gasification reactor 208 receives the coal slurry stream and an oxygen stream via conduits 214 and 210, respectively. Gasification reactor 208 facilitates the production of a hot, raw synthetic gas (syngas) stream. Moreover, gasification reactor 208 also produces a hot slag stream as a by-product of the syngas production. The slag stream is channeled to a slag handling unit 215 via a hot slag conduit 216. Slag handling unit 215 quenches and breaks up the slag into smaller pieces that form a stream that may be removed and channeled through slag conduit 217.

Gasification reactor 208 is coupled in flow communication with heat transfer apparatus 144 via a hot syngas conduit 218. Heat transfer apparatus 144 receives the hot, raw syngas stream and transfers at least a portion of its heat to HRSG 142 via conduit 146. Subsequently, heat transfer apparatus 144 produces a cooled raw syngas stream that is channeled to a scrubber and low temperature gas cooling (LTGC) unit 221 via a syngas conduit 219. LTGC 221 removes particulate matter entrained within the raw syngas stream and facilitate the removal of the removed matter via a fly ash conduit 222. LTGC 221 also provides cooling of the raw syngas stream.

Gasification system 200 also includes an acid gas removal subsystem 300 that is coupled in flow communication with LTGC 221 that receives the cooled raw syngas stream via a raw syngas conduit 220. Acid gas removal subsystem 300 facilitates the removal of at least a portion of acid components from the raw syngas stream as described in more detail below. In the exemplary embodiment, such acid gas components include, but are not limited to, $H_2S$ and $CO_2$. Acid gas removal subsystem 300 also facilitates the separation of at least some of the acid gas components into other components such as, but not limited to, $H_2S$ and $CO_2$. Moreover, acid gas removal subsystem 300 is coupled in flow communication with a transient gas treatment subsystem 400 via a conduit 223. Transient gas treatment subsystem 400 also receives, and separates, at least some of the acid gas components into other components such as, but not limited to, $H_2S$ and $CO_2$. Furthermore, transient gas treatment subsystem 400 channels a final integrated gas stream to gasification reactor 208 via acid gas removal subsystem 300 and a final integrated gas stream conduit 224. The final integrated gas stream includes predetermined concentrations of $H_2S$ and $CO_2$ that result from previous integrated gas streams as described below.

Acid gas removal subsystem 300 is coupled in flow communication with gasification reactor 208 via conduit 224. Conduit 224 channels the final integrated gas stream to predetermined portions of gasification reactor 208. The separation and removal of such $CO_2$ and $H_2S$ via acid gas removal subsystem 300 and transient gas treatment 400 produces a clean syngas stream that is channeled to gas turbine 114 via a clean syngas conduit 228.

During normal operation, air separation unit 202 receives air via conduit 204. The air is separated into $O_2$, $N_2$, and other components that are vented via a vent. The nitrogen is channeled to turbine 114 via conduit 206 and the oxygen is channeled to gasification reactor 208 via conduit 210. Also, in operation, coal grinding and slurrying unit 211 receives coal and water via conduits 212 and 213, respectively, wherein the resulting coal slurry stream is channeled to gasification reactor 208 via conduit 214.

Gasification reactor 208 receives oxygen via conduit 210, coal via conduit 214, and the final integrated gas stream from acid gas removal subsystem 300 via conduit 224. Reactor 208 produces a hot raw syngas stream that is channeled to apparatus 144 via conduit 218. Any slag by-product formed in reactor 208 is removed via slag handling unit 215 and conduits 216 and 217. Apparatus 144 cools the raw syngas stream to produce a cooled raw syngas stream that is channeled to scrubber and LTGC unit 221 via conduit 219. Within scrubber and LTGC 221, particulate matter is removed from the syngas via conduit 222 and the syngas is further cooled. The cooled raw syngas stream is channeled to acid gas removal subsystem 300 wherein acid gas components are substantially removed to form a clean syngas stream that may be channeled to gas turbine 114 via conduit 228.

Moreover, during normal operation, turbine 114 receives nitrogen and clean syngas via conduits 206 and 228, respectively. Turbine 114 combusts the syngas fuel, produces hot combustion gases, and channels the hot combustion gases to induce rotation of turbine 114.

At least a portion of the heat removed from the hot syngas via heat transfer apparatus 144 is channeled to HRSG 142 via conduit 146 wherein the heat facilitates the formation of steam. The steam is channeled to, and causes rotation of, steam turbine 132 via conduit 150. Turbine 132 rotates second generator 134 via second rotor 136.

Figure 2:
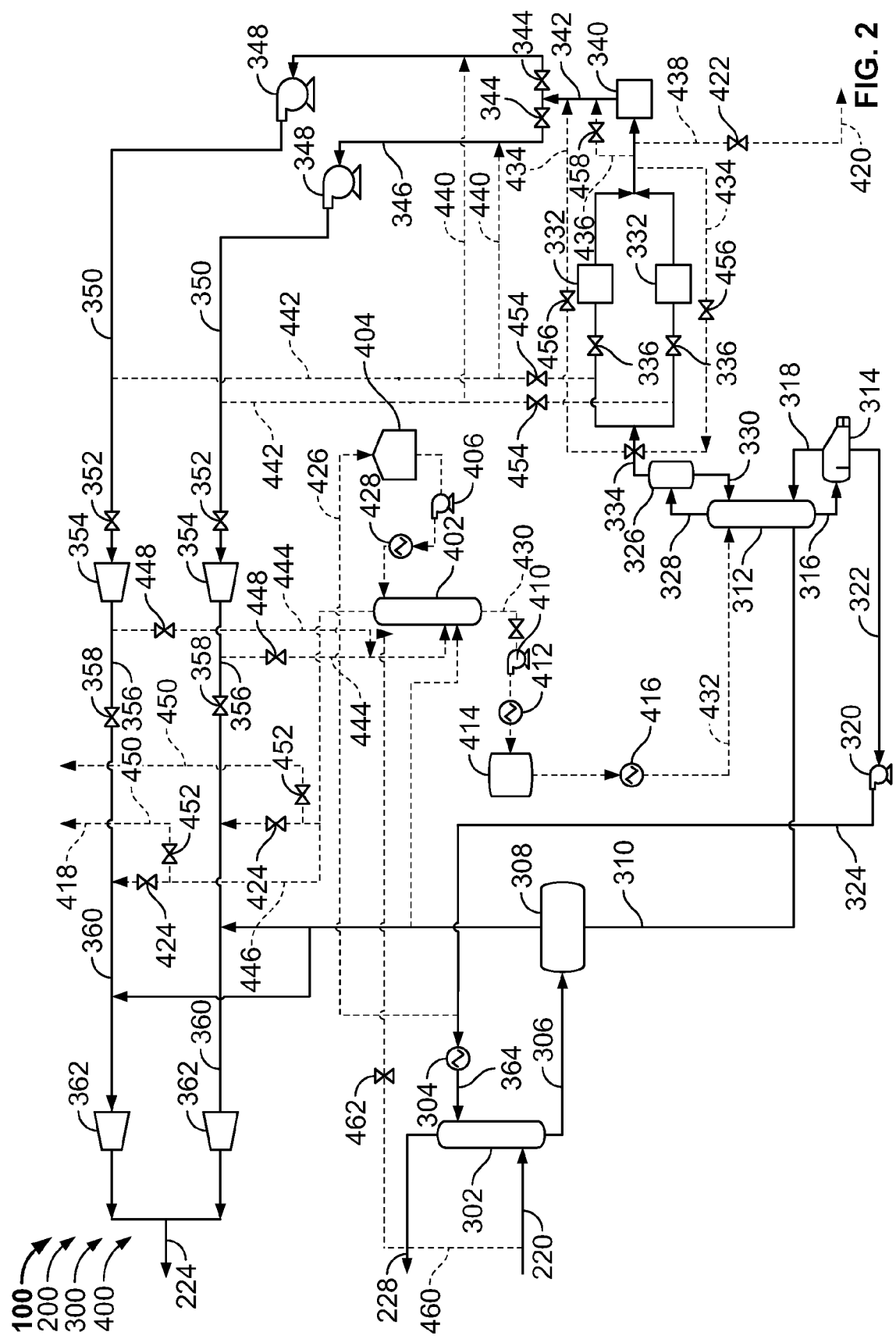
FIG. 2 is a schematic diagram of an exemplary transient process gas treatment subsystem that can be used with the IGCC power generation system shown in FIG. 1.

FIG. 2 is a schematic diagram of an exemplary acid gas removal subsystem 300 and transient gas treatment subsystem 400 that may be used with an IGCC power generation system, such as plant 100 (shown in FIG. 1). Acid gas removal subsystem 300 receives the raw stream via conduit 220. Also, acid gas removal subsystem 300 channels the clean syngas stream via conduit 228. In addition, acid gas removal subsystem 300 channels the integrated gas stream via conduit 224 to a gasification reactor, such as gasification reactor 208 (shown in FIG. 1). Conduit 220 is coupled in flow communication to at least one high pressure absorber 302. In the exemplary embodiment, acid gas removal subsystem 300 includes two high pressure absorbers 302 coupled in flow communication with conduit 220. Alternatively, acid gas removal subsystem 300 may include any number of high pressure absorbers 302 that facilitates operation of subsystem 300 as described herein.

In the exemplary embodiment, main absorber 302 uses a solvent to facilitate acid gas removal from the raw shifted syngas stream. The raw syngas stream contacts at least a portion of an acid gas-lean solvent (not shown) which removes at least a portion of the selected acid gas components from the raw syngas stream to produce the clean syngas stream. The removed acid gas components are retained within the solvent such that a first acid-gas rich, or simply rich, solvent stream is formed. In the exemplary embodiment, such acid gas components include, but are not limited to only including, $H_2S$ and $CO_2$. Alternatively, any components are removed that facilitates operation of IGCC system 100 as described herein.

In the exemplary embodiment, high pressure absorber 302 is coupled in flow communication with a flash drum 308 via first rich solvent stream conduit 306. Alternatively, high pressure absorber 302 may be coupled in flow communication with any number of flash drums 308 that facilitate the operation of acid gas removal subsystem 300 as described herein.

Flash drum 308 forms a second rich solvent stream that includes at least some remaining $CO_2$ and $H_2S$ gaseous components that were not removed by the flashing mechanism described above. As such, in the exemplary embodiment, flash drum 308 is also coupled in flow communication with at least one acid gas stripper 312 via a second rich solvent conduit 310 that channels the second rich solvent stream to acid gas stripper 312. Alternatively, a plurality of flash drums 308 may be coupled in flow communication to each other in a series or parallel configuration, wherein the plurality of flash drums 308 are coupled in flow communication with acid gas stripper 312 via any number of conduits that facilitate the operation of acid gas removal subsystem 300 as described herein.

Acid gas stripper 312 receives a rich solvent stream channeled by conduit 310. Acid gas stripper 312 regenerates the received rich solvent to a lean solvent by removing reducing the concentration of any acid gas components within the rich solvent, thereby forming a lean solvent stream that is substantially free of $CO_2$ and $H_2S$. Acid gas stripper 312 is coupled in flow communication with a reboiler 314 via a conduit 316, wherein the lean solvent stream is channeled to reboiler 314. Reboiler 314 heats the lean solvent and is coupled in flow communication with acid gas stripper 312. A portion of the heated lean solvent is channeled to acid gas stripper 312 via a conduit 318, to facilitate a vapor boilup within acid gas stripper 312 such that stripper performance is facilitated to be improved.

Reboiler 314 is also coupled in flow communication with at least one heat transfer apparatus 304 via pump 320 and conduits 322 and 324. Pump 320 and conduits 322 and 324 channel the hot lean solvent stream through heat transfer apparatus 304. Heat transfer apparatus 304 facilitates a transfer of heat from the hot lean solvent stream to the first rich solvent stream. Heat transfer apparatus 304 is coupled in flow communication with high pressure absorber 302 via conduit 364. Conduit 364 channels a warm lean solvent stream from heat transfer apparatus 304 and facilitates a removal of at least some of the heat within the warm solvent stream to form a cooler, lean solvent stream.

Acid gas stripper 312 produces a first $CO_2/H_2S$ acid gas stream as a function of regenerating the solvent as described above. Acid gas stripper 312 is coupled in flow communication with a phase separator 326 via a conduit 328. The first $CO_2/H_2S$ acid gas stream may contain solvent. Phase separator 326 facilitates removing solvent from the first $CO_2/H_2S$ acid gas stream and then channels the solvent back to acid gas stripper 312 via conduit 330. More specifically, phase separator 326 forms a second $CO_2/H_2S$ acid gas stream.

Acid gas removal subsystem 300 also includes a plurality of chemical transition units, or sulfur removal units (SRU) 332, that are coupled in flow communication with phase separator 326 via at least one conduit 334 and at least one inlet block valve 336 for each SRU 332. Each SRU 332 receives the second $CO_2/H_2S$ acid gas stream, and forms sulfur dioxide ($SO_2$) and elemental sulfur (S). Specifically, a portion of the $H_2S$ within the second $CO_2/H_2S$ acid gas stream reacts with $O_2$ to form $SO_2$. The $SO_2$ also reacts with the remaining $H_2S$ to form elemental S and $H_2O$. Unconverted $CO_2$, $SO_2$, and $N_2$ within SRU 332 form an SRU tail gas stream. Any sulfur (S) formed is removed from each SRU 332 via a conduit 338.

In the exemplary embodiment, SRUs 332 are coupled in flow communication with at least one chemical transition unit, or tail gas unit (TGU) 340, that receives the SRU tail gas stream via a conduit 338. TGU 340 also forms $H_2S$ by hydrogenating the unconverted $SO_2$ with hydrogen ($H_2$). Carbon dioxide within the second $CO_2/H_2S$ acid gas stream and the SRU tail gas stream are substantially chemically unchanged. Therefore, TGU 340 forms a second integrated gas stream. In this stream, the ratio of $CO_2$-to-$H_2S$ is substantially greater than the $CO_2$-to-$H_2S$ ratio in the second $CO_2/H_2S$ acid gas stream.

Acid gas removal subsystem 300 also includes at least one blower 348 that is coupled in flow communication with TGU 340 via conduit 342, at least one blocking valve 344, and at least one conduit 346. Moreover, in the exemplary embodiment, acid gas removal subsystem 300 includes at least one low pressure (LP) compressor 354 coupled in flow communication with blower 348 via at least one conduit 350 and at least one blocking valve 352. Furthermore, acid gas removal subsystem 300 includes at least one high pressure (HP) compressor 362 that is coupled in flow communication with LP compressor 354 via conduits 356 and 360 and valve 358. HP compressor 362 is also coupled in flow communication with conduit 224.

In the exemplary embodiment, valves 336, 344, 352, and 358 are remotely and automatically operated and are coupled in data communication with a control system (not shown). Alternatively, valves 336, 344, 352, and 358 may be operated in any manner that facilitates operation of acid gas removal subsystem 300 as described herein.

During transient operation, at least a portion of the acid components removed from the syngas stream are channeled to transient gas treatment subsystem 400 via conduit 223. Within transient gas treatment subsystem 400, acid components are removed and separated such that the final integrated gas stream may be channeled to reactor 208 via acid gas removal subsystem 300 and conduit 224.

In the exemplary embodiment, transient gas treatment subsystem 400 is coupled in flow communication with acid gas removal subsystem 300. Transient gas treatment subsystem 400 includes at least one low pressure (LP) absorber 402. LP absorber 402 is similar to HP absorber 302, in that both absorbers 302 and 402 use a solvent to separate and remove predetermined components from a fluid stream. However, LP absorber 402 is different than HP absorber 302, in that LP absorber 402 operates at a lower pressure than HP absorber 302 and selectively separates $CO_2$ from $H_2S$ retained in gases that are produced during transient operating periods such as startup, shutdown, or equipment trip periods.

Transient gas treatment subsystem 400 also includes a hot lean solvent conduit 426 that is coupled in flow communication to conduit 324. Conduit 426 channels hot lean solvent from reboiler 314 and pump 320 to a lean solvent storage tank 404. Lean solvent storage tank 404 is also coupled in flow communication to LP absorber 402 via a first pump 406 and a heat transfer apparatus 428.

In the exemplary embodiment, LP absorber 402 is also coupled in flow communication with a rich solvent storage tank 414 via a second pump 410, a heat transfer apparatus 412, and a conduit 430. Pump 410, heat transfer apparatus 412, and conduit 430 facilitate channeling rich solvent to rich solvent storage tank 414. Rich solvent storage tank 414 is coupled in flow communication with acid gas stripper 312 via a third heat transfer apparatus 416 and conduit 432.

LP absorber 402 is also coupled in flow communication with conduit 356 via at least one HP compressor bypass conduit 444 and at least one HP compressor bypass valve 448. In addition, LP absorber 402 is coupled in flow communication with at least one discharge-to-flare conduit 450 and at least one discharge-to-flare valve 452. Moreover, LP absorber 402 is coupled in flow communication with HP compressor 362 via at least one conduit 446 and at least one valve 424.

Transient gas treatment subsystem 400 also includes at least one SRU bypass conduit 440 and at least one SRU bypass valve 454 that couple phase separator 326 in flow communication with blowers 342. In addition, SRUs 332 are coupled in flow communication with at least one conduit 434 and at least one valve 456 that facilitates recycling untreated SRU tail gas for treatment in SRUs 332. SRUs 332 are also coupled in flow communication with a thermal oxidizer 420 via conduit 438 and valve 422. Moreover, SRUs 332 are coupled in flow communication with blowers 348 via a TGU bypass conduit 436 and TGU bypass valve 458. TGU bypass conduit and valve 436 and 458 channel SRU tail gas to blowers 348 during a TGU trip. Further, transient gas treatment subsystem 400 includes at least one blower bypass conduit 442 and that enables SRUs 332 and/or TGU 340 to bypass blowers 348 and to channel untreated SRU tail gas and/or untreated TGU tail gas to low pressure compressors 354.

In the exemplary embodiment, valves 422, 424, 448, 452, 454, 456, and 458 are remotely and automatically controlled valves that are coupled in data communication with a control system (not shown). Alternatively, valves 422, 424, 448, 452, 454, 456, and 458 may be operated in any manner that facilitates operation of transient gas treatment subsystem 400 as described herein.

During non-transient operation, acid gas removal subsystem 300 acts to remove at least a portion of acid components from the raw syngas stream. Such acid gas components include, but are not limited to, $H_2S$ and $CO_2$. Subsystem 300 is further configured to facilitate separation of at least some of the acid gas components into components that include, but are not limited to, $H_2S$ and $CO_2$. However, the above-described apparatus may be subject to equipment failures and shutdown operations. During plant startup, plant shutdown, or an equipment failure, also called a trip, acid gas removal system 300 may release higher emissions into the atmosphere. Transient gas treatment subsystem 400 ensures that all process streams released to the atmosphere via flare 418 or thermal oxidizer 420 can be substantially free of sulfur.

In the exemplary embodiment, during a trip of one or more SRUs 332, the acid gases from acid gas stripper 312 bypass SRUs 332 via SRU bypass conduit 440 and SRU bypass valve 454 and are channeled to blowers 348. In an alternate embodiment, the acid gases from acid gas stripper 312 bypasses SRUs 332 via blower bypass conduit 442 and SRU bypass valve 454 and are channeled to low pressure compressors 354.

In the exemplary embodiment, embodiment, untreated gases are channeled from blowers 348 to LP compressors 354 via conduit 350 and valve 352. In an alternative embodiment, untreated gases bypass blowers 348 and are channeled to LP compressors 354 via blower bypass conduit 442 and SRU bypass valve 454. HP bypass valves 448 are then closed and the pressurized, untreated tail gases and acid gases are channeled to LP absorber 402 via HP bypass conduit 444. LP absorber 402, as described above, is configured to separate and remove predetermined components from the fluid stream. The stream channeled to LP absorber 402 via HP bypass conduit 444 is treated with a lean solvent channeled to LP absorber 402 from lean solvent storage tank 404 via first pump 406 and first heat transfer apparatus 428. Within LP absorber 402, at least a portion of the sulfur from the sulfur dioxide, hydrogen sulfide, and carbonyl sulfide components is removed from the untreated gases, such that a rich solvent is produced. In the exemplary embodiment, the amount of sulfur in the gases is reduced to approximately a part-per-million (PPM) level. In alternative embodiments, the amount of sulfur removed may vary. The rich solvent is channeled to rich solvent storage tank 414 via conduit 430, second pump 410, and second heat transfer apparatus 412. In one embodiment, the rich solvent is then channeled, via third heat transfer apparatus 416 and conduit 432, to acid gas stripper 312 for regeneration. In an alternative embodiment, the rich solvent is channeled to acid gas stripper 312 using only conduit 432. Moreover, in another alternative embodiment, the overhead gases from LP absorber 402, consisting mostly of carbon dioxide, are recycled to the gasifier using HP compressors 362. Specifically, the overhead gases are channeled to HP compressors 362 via at least one conduit 446 and at least one valve 424. In a further alternative embodiment, the overhead gases from low pressure absorber 402 are vented to flare 418 via at least one conduit 450 and at least one valve 452.

In the exemplary embodiment, during a trip of TGU 340, the untreated SRU tail gas bypasses the tripped TGU 340 via TGU bypass conduit 436 and TGU bypass valve 458. In one embodiment, the untreated SRU tail gas is channeled to blowers 348 via at least one valve 344 and at least one conduit 346, and a portion of the acid gases from acid gas stripper 312 bypass SRUs 332 via SRU bypass conduit 440 and SRU bypass valve 454 and are channeled to blowers 348. Further, at least a portion of the acid gases from acid gas stripper 312 bypasses SRUs 332 via blower bypass conduit 442 and SRU bypass valve 454 and are channeled to low pressure compressors 354. In the exemplary embodiment, approximately 50% of the acid gas bypasses SRUs 332. In alternative embodiments, the proportion of the acid gas that bypasses SRUs 332 may vary. The remaining acid gases are channeled to SRUs 332 via at least one conduit 434 and at least one valve 456 to facilitate conversion to elemental sulfur.

In the exemplary embodiment, untreated gases are channeled from blowers 348 to LP compressors 354 via conduit 350 and valve 352. In an alternative embodiment, untreated gases are channeled directly to LP compressors 354 via blower bypass conduit 452 and SRU bypass valves 454. HP bypass valves 448 are then closed and the pressurized, untreated tail gases and acid gases are channeled to LP absorber 402 via HP bypass conduit 444. LP absorber 402, as described above, is configured to separate and remove predetermined components from the fluid stream. The stream channeled to LP absorber 402 via HP bypass conduit 444 is treated with a lean solvent channeled to LP absorber 402 from lean solvent storage tank 404 via first pump 406 and first heat transfer apparatus 428. Within LP absorber 402, at least a portion of the sulfur from the sulfur dioxide, hydrogen sulfide, and carbonyl sulfide components is removed from the untreated gases, such that a rich solvent is produced. In the exemplary embodiment, the amount of sulfur in the gases is reduced to approximately a part-per-million (PPM) level. In alternative embodiments, the amount of sulfur removed may vary. The rich solvent is channeled to rich solvent storage tank 414 via conduit 430, second pump 410, and second heat transfer apparatus 412. In one embodiment, the rich solvent is then channeled, via third heat transfer apparatus 416 and conduit 432, to acid gas stripper 312 for regeneration. In an alternative embodiment, the rich solvent is channeled to acid gas stripper 312 using only conduit 432. Moreover, in another alternative embodiment, the overhead gases from LP absorber 402, consisting mostly of carbon dioxide, are recycled to the gasifier using HP compressors 362. Specifically, the overhead gases are channeled to HP compressors 362 via at least one conduit 446 and at least one valve 424. In a further alternative embodiment, the overhead gases from low pressure absorber 402 are vented to flare 418 via at least one conduit 450 and at least one valve 452. The untreated SRU tail gases are partially recycled back to SRUs 332 via conduits 434 and valves 456 and the remaining gases are vented to thermal oxidizer 420 via conduit 438 and valve 422.

In the exemplary embodiment, during a trip of one or more blowers 348, valve 344 associated with the tripped blower 348 is closed to facilitate channeling a portion of the acid gas from SRUs 332 to the remaining un-tripped blowers 348. In the exemplary embodiment, approximately 50% of the acid gases bypass the tripped blower 348. In alternative embodiments, the proportion of the acid gases that bypass the tripped blower 348 may vary. The remaining acid gases are channeled to SRUs 332 via at least one conduit 434 and at least one valve 456 to facilitate conversion to elemental sulfur. In an alternative embodiment, valves 344 are closed and a portion of the acid gas from SRUs 332 is channeled to low pressure compressors 354 via blower bypass conduit 442.

In the exemplary embodiment, untreated gases are channeled from un-tripped blowers 348 to LP compressors 354 via conduit 350 and valve 352. In an alternative embodiment, untreated gases bypass blowers 348 and are channeled to low pressure compressors 354 via blower bypass conduit 442 and bypass valve 454. HP bypass valves 448 are then closed and the pressurized untreated tail gases and acid gases are channeled to LP absorber 402 via HP bypass conduit 444. LP absorber 402, as described above, separates and removes predetermined components from the fluid stream. The stream channeled to LP absorber 402 via HP bypass conduit 444 is treated with a lean solvent channeled to LP absorber 402 from lean solvent storage tank 404 via first pump 406 and first heat transfer apparatus 428. Within LP absorber 402, at least a portion of the sulfur from the sulfur dioxide, hydrogen sulfide, and carbonyl sulfide components is removed from the untreated gases, producing a rich solvent. In the exemplary embodiment, the amount of sulfur in the gases is reduced to approximately a part-per-million (PPM) level. In alternative embodiments, the amount of sulfur removed may vary. The rich solvent is channeled to rich solvent storage tank 414 via conduit 430, second pump 410, and second heat transfer apparatus 412. In the exemplary embodiment, the rich solvent is then channeled, via third heat transfer apparatus 416 and conduit 432, to acid gas stripper 312 for regeneration. In an alternative embodiment, the rich solvent is channeled to acid gas stripper 312 using only conduit 432. Moreover, in the exemplary embodiment, the overhead gases from LP absorber 402, consisting mostly of carbon dioxide, are recycled to the gasifier using HP compressors 362. Specifically, the overhead gases are channeled to HP compressors 362 via at least one conduit 446 and at least one valve 424. In an alternative embodiment, the overhead gases from low pressure absorber 402 are vented to flare 418 via at least one conduit 450 and at least one valve 452. The untreated SRU tail gases are partially recycled back to SRUs 332 via conduits 434 and valves 456 and the remaining tail gases are vented to thermal oxidizer 420 via conduit 438 and valve 422.

In the exemplary embodiment, during a trip of one or more LP compressors 354, the valve 352 associated with the tripped LP compressor 354 is closed to facilitate channeling a portion of the acid gas from blowers 348 to the remaining un-tripped LP compressors 354. In the exemplary embodiment, approximately 50% of the acid gases bypass the tripped LP compressor 354. In alternative embodiments, the proportion of the acid gases that bypass the tripped LP compressor 354 may vary. The remaining acid gases are channeled to SRUs 332 via at least one conduit 434 and at least one valve 456 to facilitate conversion to elemental sulfur. In an alternative embodiment, valves 344 close and a portion of the acid gas from SRUs 332 is channeled to low pressure compressors 354 via blower bypass valve 460 and blower bypass conduit 442.

HP bypass valves 448 are then closed and the pressurized untreated tail gases and acid gases are channeled to LP absorber 402 via HP bypass conduit 444. LP absorber 402, as described above, separates and removes predetermined components from the fluid stream. The stream channeled to LP absorber 402 via HP bypass conduit 444 is treated with a lean solvent channeled to LP absorber 402 from lean solvent storage tank 404 via first pump 406 and first heat transfer apparatus 428. Within LP absorber 402, the raw syngas stream contacts at least a portion of an acid gas-lean solvent which removes at least a portion of the selected acid gas components from the raw syngas stream to produce the clean syngas stream and a rich solvent. In the exemplary embodiment, the amount of sulfur in the gases is reduced to approximately a part-per-million (PPM) level. In alternative embodiments, the amount of sulfur removed may vary. The rich solvent is channeled to rich solvent storage tank 414 via conduit 430, second pump 410, and second heat transfer apparatus 412. In the exemplary embodiment, the rich solvent is then channeled, via third heat transfer apparatus 416 and conduit 432, to acid gas stripper 312 for regeneration. In an alternative embodiment, the rich solvent is channeled to acid gas stripper 312 using only conduit 432. In the exemplary embodiment, the overhead gases from LP absorber 402, consisting mostly of carbon dioxide, are recycled to the gasifier using HP compressors 362. Specifically, the overhead gases are channeled to HP compressors 362 via at least one conduit 446 and at least one valve 424. In an alternative embodiment, the overhead gases from low pressure absorber 402 are vented to flare 418 via at least one conduit 450 and at least one valve 452. The untreated SRU tail gases are partially recycled back to SRUs 332 via conduits 434 and valves 456 and the remaining tail gases are vented to thermal oxidizer 420 via conduit 438 and valve 422.

In the exemplary embodiment, during a trip of one or more HP compressors 362, tail gases are channeled from blowers 348 to LP compressors 354 via conduit 350 and valve 352. Moreover, in the exemplary embodiment, at least a portion of the gas from flash drum 308 is channeled to LP compressors 354. HP bypass valves 448 are then closed and the pressurized, untreated tail gases and acid gases are channeled to LP absorber 402 via HP bypass conduit 444. LP absorber 402, as described above, is configured to separate and remove predetermined components from the fluid stream. The stream channeled to LP absorber 402 via HP bypass conduit 444 is treated with a lean solvent channeled to LP absorber 402 from lean solvent storage tank 404 via first pump 406 and first heat transfer apparatus 428. Within LP absorber 402, at least a portion of the sulfur from the sulfur dioxide, hydrogen sulfide, and carbonyl sulfide components is removed from the untreated gases, such that a rich solvent is produced. In the exemplary embodiment, the amount of sulfur in the gases is reduced to approximately a part-per-million (PPM) level. In alternative embodiments, the amount of sulfur removed may vary. The rich solvent is channeled to rich solvent storage tank 414 via conduit 430, second pump 410, and second heat transfer apparatus 412. In the exemplary embodiment, the rich solvent is then channeled, via third heat transfer apparatus 416 and conduit 432, to acid gas stripper 312 for regeneration. In an alternative embodiment, the rich solvent is channeled to acid gas stripper 312 using only conduit 432. The overhead gases from LP absorber 402, consisting mostly of carbon dioxide, are vented to flare 418 via at least one conduit 450 and at least one valve 452.

In the exemplary embodiment, during a full system shutdown, main absorber 302 may be limited in the amount of raw syngas that can be treated. Accordingly, during a shutdown sequence, raw syngas, which is channeled into main absorber 302 via conduit 220, bypasses main absorber 302 via absorber bypass conduit 460 and absorber bypass valve 462. LP absorber 402, as described above, is configured to separate and remove predetermined components from the fluid stream. The stream channeled to LP absorber 402 via main absorber bypass conduit 460 is treated with a lean solvent channeled to LP absorber 402 from lean solvent storage tank 404 via first pump 406 and first heat transfer apparatus 428. Within LP absorber 402, at least a portion of the sulfur from the sulfur dioxide, hydrogen sulfide, and carbonyl sulfide components is removed from the untreated gases, such that a rich solvent is produced. In the exemplary embodiment, the amount of sulfur in the gases is reduced to approximately a part-per-million (PPM) level. In alternative embodiments, the amount of sulfur removed may vary. The rich solvent is channeled to rich solvent storage tank 414 via conduit 430, second pump 410, and second heat transfer apparatus 412. In the exemplary embodiment, the rich solvent is then channeled, via third heat transfer apparatus 416 and conduit 432, to acid gas stripper 312 for regeneration. In an alternative embodiment, the rich solvent is channeled to acid gas stripper 312 using only conduit 432. Moreover, in the exemplary embodiment, the overhead gases from LP absorber 402, consisting mostly of carbon dioxide, are recycled to the gasifier using HP compressors 362. Specifically, the overhead gases are channeled to HP compressors 362 via at least one conduit 446 and at least one valve 424. In an alternative embodiment, the overhead gases from low pressure absorber 402 are vented to flare 418 via at least one conduit 450 and at least one valve 452.

Transient gas treatment subsystem 400 facilitates mitigating a concentration of sulfur-containing species such as, but not limited to, $H_2S$ in the raw and clean syngas streams by substantially mitigating the concentration of $H_2S$ in the gas stream channeled to gasification reactor 208. LP absorber 402 is in service during transient periods, whereby LP absorber 402 substantially removes $H_2S$ as described above. Such mitigation in the H2S concentration facilitates lower emissions during transient periods thereby increasing flexibility of operation of IGCC system 100.

The above-described methods and apparatus permit transient process gas treatment of an integrated gasification combined-cycle (IGCC) system, such as those used in power plants, with minimal sulfur emissions. Specifically, emissions produced during a transient process are routed through a low pressure absorber where the emissions are mixed with a lean solvent to facilitate reducing the number of emissions produced. The resulting rich solvent is routed to an acid gas stripper to further remove emissions and the overhead gas from the low pressure absorber is recycled into the gasifier.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Although the apparatus and methods described herein are described in the context of a transient process gas treatment system for an integrated gasification combined-cycle (IGCC) power system, it is understood that the apparatus and methods are not limited to transient process gas treatment systems or IGCCs. Likewise, the system components illustrated are not limited to the specific embodiments herein, but rather, components of the system can be utilized independently and separately from other components described herein.

While the invention has been described in terms of various specific embodiments, those skilled in the art will recognize that the invention can be practiced with modification within the spirit and scope of the claims.

What is claimed is:

1. A method for reducing sulfur emissions, said method comprising:
   routing at least a portion of an untreated gas to a relatively low pressure absorber, wherein routing at least a portion of an untreated gas to a relatively low pressure absorber comprises:
   identifying a transient system condition;
   adjusting a flow path for the untreated gas;
   removing at least a portion of sulfur from the untreated gas, creating a low pressure absorber overhead gas; and
   further processing the low pressure absorber overhead gas.

2. A method in accordance with claim 1 wherein adjusting a flow path for the untreated gas includes:
   if the transient system condition is caused by a trip of one of at least one sulfur removal unit, a tail gas unit, and at least one relatively high pressure compressor:
      routing the untreated gas to one of at least one blower and at least one relatively low pressure compressor;
   if the transient system condition is caused by a trip of at least one blower:
      routing the untreated gas to one of at least one non-tripped blower and at least one relatively low pressure compressor;
   if the transient system condition is caused by a trip of one of the at least one relatively low pressure compressor:
      routing the untreated gas to one of at least one blower and at least one non-tripped relatively low pressure compressor; and
   if the transient system condition is caused by a system shutdown:
      routing the untreated gas to the relatively low pressure absorber.

3. A method in accordance with claim 1 wherein removing sulfur from the untreated gas further comprises:
   mixing the untreated gas with an emissions-lean solvent; and
   regenerating the resulting emissions-rich solvent in an acid gas stripper.

4. A method in accordance with claim 1 wherein further processing the low pressure absorber overhead gas further comprises routing the low pressure absorber overhead gas to one of at least one relatively high pressure compressor and at least one flare.

5. A method in accordance with claim 1 further comprising:
routing the untreated gas to a sulfur removal unit; and
routing the untreated gas to a thermal oxidizer.

6. A method in accordance with claim 2 wherein the tripped component is a relatively high pressure compressor, and wherein further processing the low pressure absorber overhead gas further comprises routing the low pressure absorber overhead gas to at least one flare.

7. A method for removing sulfur from transient process gases, said method comprising:
isolating a first portion of an untreated gas from a second portion of the untreated gas;
routing the first portion of the untreated gas to a relatively low pressure absorber;
removing at least a portion of sulfur from the first portion of the untreated gas, creating a low pressure absorber overhead gas;
further processing the low pressure absorber overhead gas; and
recycling the second portion of the untreated gas.

8. A method in accordance with claim 7 wherein routing the first portion of the untreated gas to a relatively low pressure absorber further comprises:
identifying a transient system condition; and
adjusting a flow path for the first portion of the untreated gas.

9. A method in accordance with claim 8 wherein adjusting a flow path for the combined gases includes:
if the transient system condition is caused by a trip of one of at least one sulfur removal unit, a tail gas unit, and at least one relatively high pressure compressor:
routing the first portion of the untreated gas to one of at least one blower and at least one relatively low pressure compressor;
if the transient system condition is caused by a trip of at least one blower:
routing the combined gases to one of at least one non-tripped blower and at least one relatively low pressure compressor;
if the transient system condition is caused by a trip of a relatively low pressure compressor:
routing the combined gases to one of at least one blower and at least one non-tripped relatively low pressure compressor; and
if the transient system condition is caused by a system shutdown:
routing the untreated gas to the relatively low pressure absorber.

10. A method in accordance with claim 7 wherein removing sulfur from the first portion of the untreated gas includes:
mixing the combined gases with an emissions-lean solvent; and
regenerating the resulting emissions-rich solvent in an acid gas stripper.

11. A method in accordance with claim 7 wherein further processing the low pressure absorber overhead gas further comprises routing the low pressure absorber overhead gas to one of at least one relatively high pressure compressor and at least one flare.

12. A method in accordance with claim 7 wherein recycling the second portion of the untreated gas includes:
routing the second portion of the untreated gas to a sulfur removal unit; and
routing the second portion of the untreated gas to a thermal oxidizer.

13. A method in accordance with claim 9 wherein the tripped component is a relatively high pressure compressor, and wherein further processing the low pressure absorber overhead gas further comprises routing the low pressure absorber overhead gas to the at least one flare.

14. A treatment system for transient process gases comprising:
at least one sulfur removal unit;
a tail gas unit coupled in flow communication downstream from said at least one sulfur removal unit;
at least one blower coupled in flow communication downstream from said tail gas unit;
at least one relatively low pressure compressor coupled in flow communication downstream from said at least one blower;
a relatively low pressure absorber coupled in flow communication downstream from said at least one relatively low pressure compressor;
an acid gas stripper coupled in flow communication downstream from said relatively low pressure absorber; and
at least one relatively high pressure compressor coupled in flow communication downstream from said at least one relatively low pressure compressor, said treatment system configured to, during a system shutdown sequence, bypass a main absorber by routing a raw syngas to said relatively low pressure absorber, said treatment system further configured to treat transient process gases by:
combining at least a portion of an untreated tail gas and a portion of an acid gas;
routing the combined gases to said relatively low pressure absorber;
removing at least a portion of sulfur from the combined gases, creating a low pressure absorber overhead gas; and
further processing the low pressure absorber overhead gas.

15. A treatment system in accordance with claim 14, said treatment system further configured to route the combined gases to a relatively low pressure absorber based on:
identifying a transient system condition; and
adjusting a flow path for the combined gases.

16. A treatment system in accordance with claim 15, said treatment system further configured to adjust a flow path for the combined gases based on:
if the transient system condition is caused by a trip of one of said at least one sulfur removal unit, said tail gas unit, and said at least one relatively high pressure compressor:
routing the combined gases to one of said at least one blower and said at least one relatively low pressure compressor;
if the transient system condition is caused by a trip of said at least one blower:
routing the combined gases to one of an at least one non-tripped blower and said at least one relatively low pressure compressor; and
if the transient system condition is caused by a trip of said at least one relatively low pressure compressor:
routing the combined gases to one of said at least one blower and an at least one non-tripped relatively low pressure compressor.

17. A treatment system in accordance with claim 16, said treatment system further configured to adjust a flow path for the combined gases based on:

identifying said tail gas unit as the tripped component;
routing the portion of the acid gas to one of said at least one blower and said at least one relatively low pressure compressor.

18. A treatment system in accordance with claim 14, said treatment system further configured to further process the second portion of the untreated tail gas based on:
routing the untreated tail gas to a sulfur removal unit; and
routing the untreated tail gas to a thermal oxidizer.

19. A treatment system in accordance with claim 16 wherein said at least one relatively high pressure compressor is in a tripped condition, said system further configured to process the low pressure absorber overhead gas by routing the low pressure absorber overhead gas to at least one flare coupled in flow communication downstream from said relatively low pressure absorber.

* * * * *